3,804,812
PROCESS FOR PREPARING A SEGMENTED
LINEAR POLYURETHANE POLYMER
Anthony Koroscil, Trumbull, Conn., assignor to American
Cyanamid Company, Stamford, Conn.
Filed Nov. 3, 1972, Ser. No. 303,582
Int. Cl. C08g 22/14
U.S. Cl. 260—77.5 AM                        15 Claims

ABSTRACT OF THE DISCLOSURE

An improved process for preparing a segmented linear polyurethane polymer is provided which consists of preparing a prepolymer by reacting polytetramethylene ether glycol with methylenebis(4-phenyl-isocyanate) and chain extending the resulting isocyanate terminated prepolymer, in solution, with a suitable aliphatic diamine or a glycol, the improvement which comprises employing a polytetramethylene ether glycol having a molecular weight between 2500 and 7500. In addition, the invention also provides an improved spandex fiber prepared from such segmented linear polyurethane polymer.

---

Figure 1:
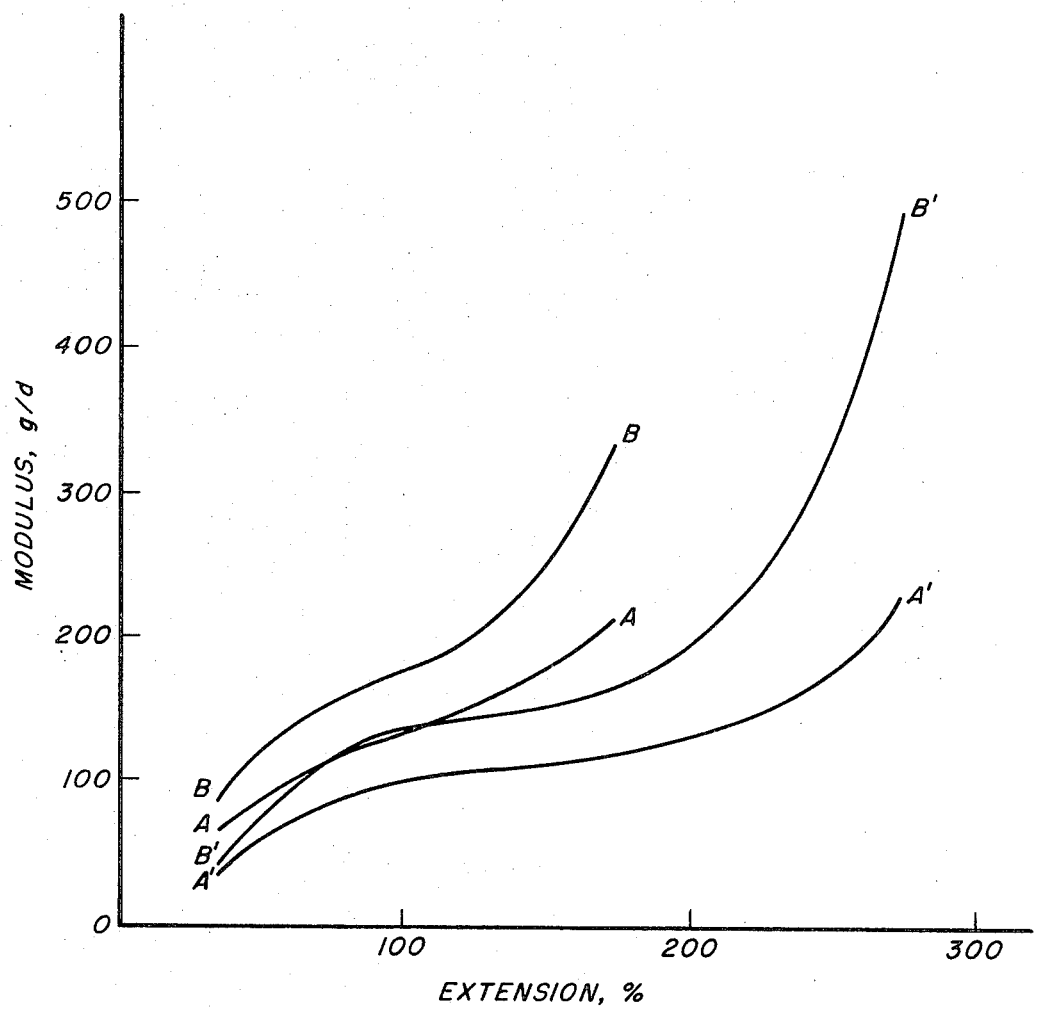

Generally stated, the subject matter of the present invention relates to an improved method for preparing segmented polyurethane polymers. More particularly, the invention relates to an improved method for preparing segmented polyurethane polymers from high molecular weight polytetramethylene ether glycol, and to the elastomeric fibers spun therefrom.

BACKGROUND OF THE INVENTION

Spandex fibers and films are composed of segmented linear polyurethane polymers in which the polymer molecules contain both hard and soft segments. The soft segments are the residues of hydroxyl-terminated polyesters or polyethers of high molecular weight. The hard segments contain urethane and urea groups which result from the reaction of these polyesters or polyethers with organic diisocyanates, and the resultant isocyanate-terminated prepolymers are further polymerized or chain-extended by reacting them with difunctional compounds such as diamines or glycols.

In the manufacture of stretch garments from such fibers it is necessary for such garments to be capable of being stretched without a great exertion of force, and also that such garments will comfortably fit many sizes of wearers. The fibers should have a relatively flat recovery modulus curve after repeated stretch and relaxation cycles, that is fibers with a relatively constant holding, or support power as the fibers are stretched and relaxed Although the art has developed to the extent that stretch garments are commonly accepted and worn, the development of fibers with a relatively flat recovery modulus curve has eluded all attempts at development.

The present invention represents the culmination of a long series of investigations conducted largely by the inventor directed to uncovering a method for preparing a segmented linear polyurethane polymer which is capable of being prepared into a spandex fiber having a relatively flat recovery modulus curve.

Accordingly, it is a primary object of the present invention to provide a method for preparing segmented linear polyurethane polymers which are capable of being prepared into spandex fibers and films that have a relatively flat recovery modulus curve.

Another object of the invention is to provide fibers with a high ultimate elasticity, that is a high break elongation.

It is yet another object of the invention to provide a non-gelling fiber spinning solution of segmented linear polyurethane polymers.

Generally then, it is an object of the invention to provide spandex fibers which have a relatively flat recovery modulus curve, as well as fibers which have the normal desirable physical properties of spandex fibers.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to an improved process for perparing a segmented linear polyurethane polymer which consists of preparing a prepolymer by reacting polytetramethylene ether glycol with methylenebis(4-phenyl isocyanate) and chain extending the resulting isocyanate terminated prepolymer, in solution, with a suitable aliphatic diamine or a glycol, the improvement which comprises employing a polytetramethylene ether glycol having a molecular weight between 2500 and 7500.

The present invention further provides an improved spandex fiber having a relatively flat recovery modulus curve.

It is to be understood that both the foregoing general description and the following detailed description are exemplary and explanatory and are not restrictive of the invention.

The utilization of polytetramethylene ether glycol as the soft segment of the polyurethane polymer is well recognized and accepted in the art. U.S. Pat. No. 2,929,800, Hill, discloses the use of polyalkylene ether glycols, including polytetramethylene ether glycol, having a molecular weight of 750 to 10,000, in conventional types of elastomeric polyurethane polymers. In addition, U.S. Pat. No. 3,071,557, Frazer et al., discloses the use of tolylene diisocyanate modified polytetramethylene ether glycol, having a molecular weight of up to 8000, in a conventional polyurethane polymer. The present invention particularly resides in the discovery that the molecular weight of the polytetramethylene ether glycol is of particular significance to the recovery modulus curve of fibers spun from polymers prepared therefrom.

The polytetramethylene ether glycol of use in this invention then, should have a molecular weight between 2500 and 7000, preferably between 3200 and 5000. The high molecular weight glycol can be obtained by ring polymerization of tetrahydrofuran or by reacting 2 moles of polytetramethylene ether glycol of low molecular weight with 1 mole of a diisocyanate, such as tolylene diisocyanate or hexamethylene diisocyanate. The latter procedure effectively doubles the molecular weight of the polytetramethylene ether glycol.

The isocyanate-terminated prepolymer is produced by reacting 1 mole of the polytetramethylene ether glycol of high molecular weight with between 1.5 moles, preferably between 1.7 moles and 2.2 moles, of methylenebis(4-phenyl isocyanate). The reaction is carried out at a temperature between 20° and 150° C., preferably between 60° and 90° C.

Chain extention of the isocyanate-terminated prepolymer is carried out by reacting the prepolymer in solution with a suitable aliphatic diamine or a glycol. The equivalent amount of isocyanate-terminated prepolymer and diamine or glycol are employed. The chain-extension reaction can be carried out in a conventional manner at a temperature between 0° and 100° C., preferably between 20° and 40° C.

Solvents of use in the chain extension process are conventional solvents for polyurethane polymers and have the same meaning as the term "polyacrylonitrile solvents" in U.S. Pat. No. 3,388,100, Thoma et al. The preferred solvents of this class are the dimethylcarbamyl compounds such as dimethylformamide, dimethylacetamide, dimethylpropionamide, the corresponding alkoxymethyl compounds such as methoxydimethylacetamide, and other highly polar solvents such as N-methylpyrrolidone and dimethyl sulfoxide.

Suitable organic chain extending agents include, for example, ethylenediamine, hydrazine, dimethylpiperazine, methyliminobispropylamine, m-phenylenediamine, 4,4'-diaminodiphenylmethane, ethylene glycol, hexamethylene glycol, diethylene glycol, hydroquinone, etc. The preferred aliphatic diamine chain extending agent is a combination of ethylenediamine and methyliminobispropylamine. The concentration of ethylenediamine to methyliminobispropylamine is in a mole ratio of 10:1.

In a variation of the process of this invention, a glycol containing urea moieties, and formed by reaction of 1 mole of an organic diisocyanate with 2 moles of an amino alcohol, is the preferred glycol chain extending agent. Such glycols have been referred to as "adducts." Suitable amino alcohols have alkylene chains of 2–6 carbon atoms, as exemplified by 2-aminoethanol, 4-amino-1-butanol, etc. The diisocyanate is preferably methylenebis(4-phenyl isocyanate), but other diisocyanates, such as tolylene diisocyanate, may be used. The glycol can be reacted with an isocyanate-terminated prepolymer in a conventional manner or it can be reacted in situ with the components of the prepolymer, namely; polytetramethylene ether glycol and methylenebis(4-phenyl isocyanate).

The polymer solution can be wet or dry spun by conventional techniques to give an elastomeric filament having the desired elastic recovery properties, or the solution can be used to form other shaped articles, such as films or castings.

Dyes, pigments, antioxidants, stabilizers and other additives may be incorporated in the polyurethane solution by adding at any stage before formation of the shaped article, but are preferably added to the polymer solution after the chain extension step.

The polymer solutions obtained by the process of this invention are non-gelling, have long storage lives and are easily spun into filaments or cast into films.

The following examples are provided for illustrative purposes and may include particular features of the invention. However, the examples should not be construed as limiting the invention, many variations of which are possible without departing from the spirit or scope thereof.

Example I

To an adduct formed in situ by mixing 103.1 g. of 2-aminoethanol, 11,000 g. of dimethylformamide and 211.3 g. of methylenebis(4-phenyl isocyanate) there is added 4830 g. of an extended polytetramethylene ether glycol of average molecular weight 4200, formed by reaction of 2 moles of polytetramethylene ether glycol of average molecular weight of 1970 with 1 mole of tolylene diisocyanate (80/20 mixture of 2,4- and 2,6-isomers) at 90° C. for 1 hour, and 534 g. of methylenebis(4-phenyl isocyanate). The resulting solution is stirred at 80° C., and when the viscosity reaches 4000 poises, sufficient dimethylformamide is added to reduce the solids concentration to 30 percent. Similarly, when the viscosity reaches 1400 poises at 30 percent solids, the solution is further diluted with dimethylformamide to 25 percent solids, and when the viscosity reaches 450 poises, the solution is diluted with dimethylformamide to 17 percent solids. After 1 hour, the solution is treated with 5 g. of n-butylamine. A portion of the solution, 2500 g. is treated with 70 g. of a 50/50 titanium dioxide-dimethylformamide mixture and 15 ml. of a 33 percent 4,4'-butylidenebis(6-tert-butyl-m-cresol) solution in dimethylformamide.

The polymer solution is forced at constant speed by means of a precision gear pump through a spinnerette immersion in water, the spinnerette having 70 holes of 0.006" dia. The extruded, semi-plastic monofilaments are brought together to form a single coalesced multifilament fiber which is passed through a series of baths to extract the dimethylformamide by countercurrent washing with water. The wet fiber is then continuously dried and cured on a belt dryer and finally wound on spools.

Fibers of 475 denier have a 300 percent modulus of about 0.062 g./d., an ultimate tenacity of about 0.626 g./d. and an ultimate elongation of about 750 percent.

The holding or support power of the fibers of this example is measured by a procedure based on methods described in Industrie Textiles Belge 7, 69–77 (1965) and Du Pont Technical Information Bulletin L–17 (1965). An "Instron" tensile testing machine is used for the stress-strain tests using three cycles of loading and unloading and maximum elongations of 200 and 300 percent. The holding power is calculated for different extensions from 35 to 275 percent using the formula:

$$\text{Holding power} = \frac{\text{Load in grams on recovery cycle}}{\text{Denier}}$$

Instead of "holding power," the equivalent expression "modulus retention" has been used.

The "modulus retention" of the fibers at 200 and 300 percent cycling, expressed as the third cycle recovery modulus ($M \times 10^{-4}$) at elongations from 35 to 275 percent are shown in Table 1 and graphically in FIG. 1. Curves A and A' of FIG. 1 correspond to maximum elongations of 200 and 300 percent respectively.

TABLE 1

Third cycle recovery modules ($M \times 10^{-4}$) at extension

| | 35% | 50% | 75% | 100% | 125% | 150% | 175% | 200% | 225% | 250% | 275% |
|---|---|---|---|---|---|---|---|---|---|---|---|
| 200% cycling elongation | 62 | 91 | 117 | 134 | 152 | 179 | 215 | | | | |
| 300% cycling elongation | 39 | 61 | 86 | 101 | 108 | 110 | 116 | 128 | 144 | 172 | 227 |

When, for comparison, a similar polymer solution is prepared using a non-extended polytetramethylene ether glycol of average molecular weight 2050 instead of the extended polytetramethylene other glycol, fibers of 413 denier spun from the solution have a 300 percent modulus of about 0.211 g./d., an ultimate tenacity of about 1.028 g./d. and an ultimate elongation of about 581 percent.

The holding power of the fibers is shown in Table 2 and graphically in FIG. 1. Curves B and B' of FIG. 1 correspond to a maximum elongation of 200 and 300 percent respectively.

Third cycle recovery modulus ($M \times 10^{-4}$) at extension:

TABLE 2

| | 35% | 50% | 75% | 100% | 125% | 150% | 175% | 200% | 225% | 250% | 275% |
|---|---|---|---|---|---|---|---|---|---|---|---|
| 200% cycling elongation | 87 | 121 | 161 | 179 | 201 | 244 | 337 | | | | |
| 300% cycling elongation | 41 | 79 | 120 | 136 | 144 | 153 | 171 | 201 | 246 | 327 | 495 |

Curve A of FIG. 1 should be compared with Curve B, and Curve A' with Curve B'. It will be noted that Curves A and A' are flatter than Curves B and B', respectively.

The average increase in modulus in the flatest section, between 50 and 200 percent extension, of the 300 percent curve of FIG. 1 for the product from the polyglycol of 4200 molecular weight is $0.45 \times 10^{-4}$ g./d./1 percent increase in extension. The average increase in modulus between 50 and 200 percent extension for the product from the polyglycol of 2050 molecular weight is $0.81 \times 10^{-4}$ g./d./1 percent of extension.

This example demonstrates the relative constancy of the holding power of fibers prepared from a polytetramethylene ether glycol of 4200 molecular weight versus similar fibers prepared from polytetramethylene ether glycol of 2050 molecular weight.

Example II

A mixture of 1000 g. of polytetramethylene ether glycol (average molecular weight 4000) and 125 g. of methylenebis(4-phenyl isocyanate) is heated at 75–80° C. for 1 hour. The resulting isocyanate-terminated prepolymer is diluted with 1125 g. of dimethylformamide. To a solution of 1.44 g. of methyliminobispropylamine in 1900 g. of dimethylformamide there is added 20 g. of the prepolymer solution, followed by 5.45 g. of ethylenediamine and 4.0 ml. of a solution of diethanolamine in dimethylformamide (1.133 g./5 ml. solution). The prepolymer solution is slowly added until a viscosity of 120 poises is obtained. To the resulting polymer solution there is added 85 g. of a 50/50 mixture of titanium dioxide and dimethylformamide and 7.8 ml. of a 33 percent solution of 4,4'-butylidenebis (6-tert-butyl-m-cresol) in dimethylformamide.

Fibers of 525 denier, spun by the process of Example I, have a 300% modulus of about 0.178 g./d., an ultimate tenacity of about 1.064 g./d. and an ultimate elongation of about 683 percent. The holding or support power of the fibers is shown in Table 3 and graphically in FIG. 2. Curves A and A' of FIG. 2 correspond to maximum elongations of 200 and 300 percent, respectively.

Third cycle recovery modulus ($M \times 10^{-4}$) at extension:

TABLE 3

|  | 35% | 50% | 75% | 100% | 125% | 150% | 175% | 200% | 225% | 250% | 275% |
|---|---|---|---|---|---|---|---|---|---|---|---|
| 200% cycling elongation | 87 | 121 | 144 | 157 | 174 | 207 | 268 |  |  |  |  |
| 300% cycling elongation | 49 | 85 | 105 | 112 | 117 | 121 | 128 | 143 | 175 | 228 | 322 |

When, for comparison, a similar polymer solution is prepared using a polytetramethylene ether glycol of average molecular weight 2000, instead of molecular weight 4000, fibers of 334 denier spun from the solution have a 300 percent modulus of about 0.257 g./d., an ultimate tenacity of about 0.993 g./d. and an ultimate elongation of about 615 percent.

Figure 2:
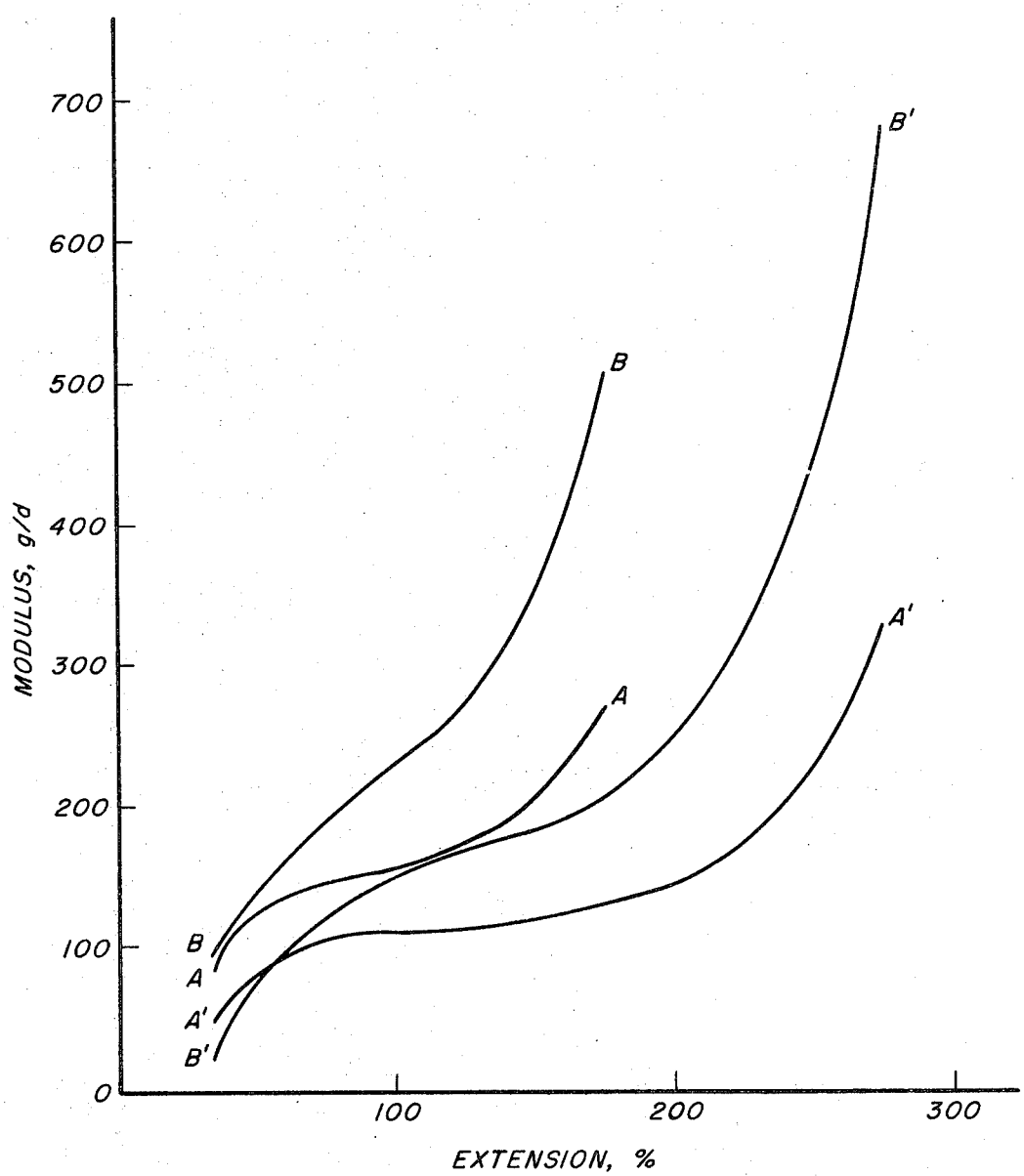

The holding power of the fibers is shown in Table 4 and graphically in FIG. 2. Curves B and B' of FIG. 2 correspond to maximum elongation of 200 and 300 percent respectively.

Third cycle recovery modulus ($M \times 10^{-4}$) at extension:

TABLE 4

|  | 35% | 50% | 75% | 100% | 125% | 150% | 175% | 200% | 225% | 250% | 275% |
|---|---|---|---|---|---|---|---|---|---|---|---|
| 200% cycling elongation | 90 | 141 | 191 | 233 | 269 | 344 | 509 |  |  |  |  |
| 300% cycling elongation | 27 | 66 | 122 | 152 | 170 | 185 | 206 | 245 | 314 | 437 | 681 |

Curve A of FIG. 2 should be compared with Curve B, and Curve A' with B'. It will be noted that Curves A and A' are flatter than Curves B and B', respectively.

The average increase in modulus in the flatest section, between 50 and 200 percent extension, of the 300 percent curve for the product from the polyglycol of 4000 molecular weight of $0.39 \times 10^{-4}$ g./d./1 percent increase in extension. The average increase in modulus between 50 and 200 percent extension for the product from the polyglycol of 2000 molecular weight is $1.19 \times 10^{-4}$ g./d./1 percent increase in extension.

This example also demonstrates the improved physical properties of a fiber of this invention.

I claim:

1. In a process for preparing a segmented linear polyurethane polymer which consists of preparing a prepolymer by reacting polytetramethylene ether glycol with methylenebis(4-phenyl-isocyanate) and chain extending the resulting isocyanate terminated prepolymer in solution with a suitable aliphatic diamine or a glycol, the improvement which comprises employing a polytetramethylene ether glycol having a molecular weight between 2500 and 7500.

2. The process according to claim 1 wherein the molecular weight of the polytetramethylene ether glycol is between 3200 and 5000.

3. The process according to claim 1 wherein 1 mole of the polytetramethylene ether glycol is reacted with between 1.5 to 2.5 moles of methylenebis(4-phenyl isocyanate).

4. The process according to claim 3 wherein the concentration of methylenebis(4-phenyl isocyanate) is between 1.7 to 2.2 moles.

5. The process according to claim 1 wherein the reaction between the polytetramethylene ether glycol and the methylenebis(4-phenyl isocyanate) is carried out at a temperature of from about 20° to 150° C.

6. The process according to claim 5 wherein the temperature is from about 60° to 90° C.

7. The process according to claim 1 wherein the chain extension reaction is carried out at a temperature of from about 0° to 100° C.

8. The process according to claim 7 wherein the temperature is from about 20° to 40° C.

9. The process according to claim 1 wherein the prepolymer is dissolved in a dimethylformamide.

10. The process according to claim 1 wherein the isocyanate terminated prepolymer is reacted with an aliphatic diamine.

11. The process according to claim 10 wherein the aliphatic diamine is a mixture of ethylenediamine and methyliminobispropylamine.

12. The process according to claim 11 in which the concentration of ethylenediamine to methyliminobispropylamine is in a mole ratio of 10:1.

13. The process according to claim 1 wherein the isocyanate terminated prepolymer is reacted with glycol.

14. The process according to claim 13 wherein the glycol contains urea moieties and is formed by the reaction of 1 mole of an organic diisocyanate with 2 moles of an amino alcohol.

15. A spandex fiber prepared from the segmented linear polyurethane polymer prepared according to claim 1.

References Cited

UNITED STATES PATENTS 2,929,800    3/1960    Hill _____ 260—77.5 AP

OTHER REFERENCES

Saunders et al., Polyurethanes, Part II, Interscience, New York, 1964, pp. 667 and 668.

MAURICE J. WELSH, Primary Examiner

U.S. Cl. X.R.

260—77.5 AP, 77.5 AT

UNITED STATES PATENT OFFICE
CERTIFICATE OF CORRECTION

Patent No. 3,804,812　　　　　　　　Dated April 16, 1974

Inventor(s) ANTHONY KOROSCIL

It is certified that error appears in the above-identified patent and that said Letters Patent are hereby corrected as shown below:

Column 4, line 14, "immersion" should read -- immersed --.

Column 4, line 52 "other" should read -- ether --.

Column 4, lines 50 - 60 the marginal numbers are upside down.

Signed and sealed this 13th day of August 1974.

(SEAL)
Attest:

McCOY M. GIBSON, JR.　　　　　C. MARSHALL DANN
Attesting Officer　　　　　　　Commissioner of Patents